(No Model.)
L. GRAY.
BEAM FOR SHOVEL PLOWS.
No. 283,390. Patented Aug. 21, 1883.
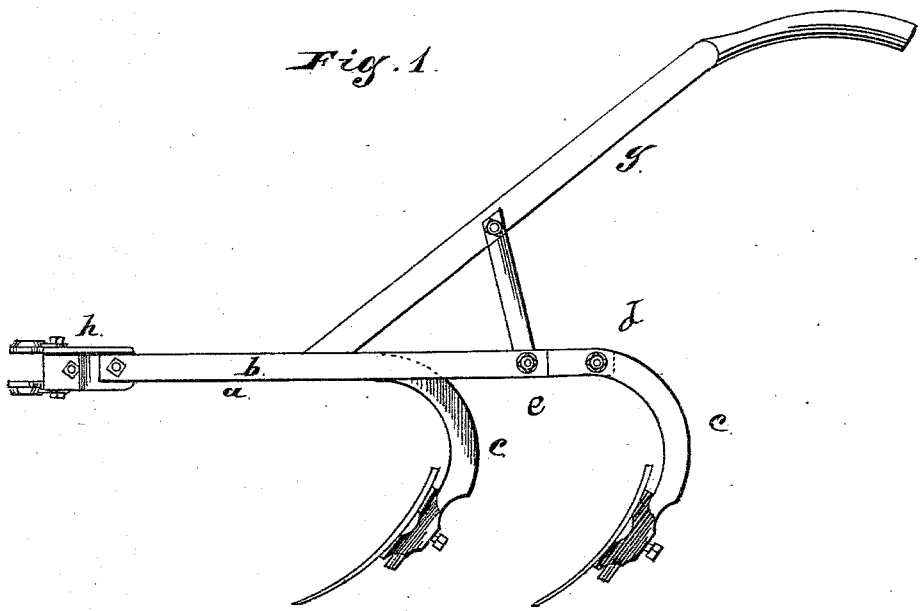
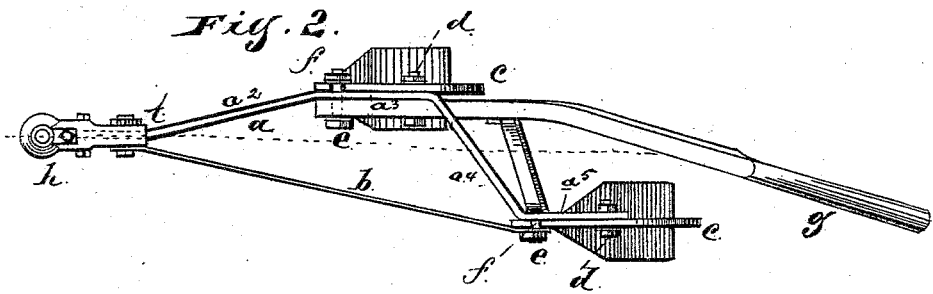
Witnesses:
B. A. Price
Albert H. Adams
Inventor
Leroy Gray
By West & Bond
His Attys.

UNITED STATES PATENT OFFICE.

LEROY GRAY, OF SYCAMORE, ILLINOIS.

BEAM FOR SHOVEL-PLOWS.

SPECIFICATION forming part of Letters Patent No. 283,390, dated August 21, 1883.

Application filed November 6, 1882. (No model.)

*To all whom it may concern:*

Be it known that I, LEROY GRAY, residing at Sycamore, in the county of De Kalb and State of Illinois, and a citizen of the United States, have invented new and useful Improvements in Beams for Shovel-Plows, of which the following is a full description, reference being had to the accompanying drawings, in which—

Figure 1 is a side elevation, and Fig. 2 a top or plan view.

The object of this invention is to make an iron cultivator or shovel-plow beam lighter and cheaper in its construction than has been heretofore made; and its nature consists in bending and bracing the beam, as hereinafter more fully described.

In the drawings, $a$ indicates the main bar of the beam; $b$, the brace; $c\ c$, shovel-standards; $d$, pivot-bolts for the shovel-standards; $e$, clamp-bolts; $f$, notches in the upper forward ends of the plow-standards; $g$, handle, and $h$ clevis.

The bar $a$ is made of a wrought-iron bar bent as shown at Fig. 2, so that the neutral or draft line (indicated by the dotted line in Fig. 2) will pass between the two shovels, and each shovel balance the other when power is applied to draw them through the soil; and in order to give them this position and have the draft right, the bar is bent or curved at or near the clevis $h$ away from the straight draft-line at one side, as shown in said Fig. 2 by letter $a^2$, and then carried parallel with the line of draft a sufficient distance to give a firm attachment for the forward shovel-standard, as is shown by $a^3$. The bar is again bent from this point and carried across the draft-line, as is shown by $a^4$, sufficiently far to give the rear plow a proper location, and then bent at its rear end, as is shown by $a^5$, parallel with the draft-line, to give a proper connection for the rear shovel-standard. The bar $a$ is made of flat bar-iron, about one-half of the usual size of wrought-iron plow-beams. A size the same as that used for the standards will be sufficient. The bar $a$ bent in this form would be too springy and weak for ordinary use, and to correct this and produce a light metallic beam I connect the rear end of the plow-bar with the clevis or the front end of the bar by the metal strap or rod $b$. I attach it by means of the bolts used for connecting the clevis and the rear standard, so that no additional bolts are required, and so that the brace $b$ may be attached or detached at will. The shovels are provided with tubular castings at the back and set-screws for adjustably attaching them to the standards, and the standards, with the notches $f$ and clamp-bolts $e$, are so nearly of the usual construction that I make no claim for them. This beam is primarily designed for one of the beams of a double or straddle row cultivator, the one shown being the left-hand one; but it is evident that by applying another handle it may be used for constructing a single double-shovel plow, and the attachment by the clevis $h$ to the frame-work or axle of a cultivator, or to a double-tree, may be by any of the well-known means or devices.

I do not limit myself to the attachment of the brace $b$ by the bolts shown, as it may be permanently riveted or attached to the bar $a$.

I am aware of Reissued Letters Patent No. 7,833, and do not claim what is therein shown.

I do not claim, broadly, a beam constructed of a bent iron bar; but

What I claim as new, and desire to secure by Letters Patent, is—

The metallic cultivator-beam or shovel-frame herein described, consisting of the bar $a$, having the oppositely-bent or oblique portions $a^2$ and $a^4$, the straight portion $a^3$, connecting the same, the straight rear portion, $a^5$, forming a continuation of the oblique portion $a^4$, the straight oblique brace $b$, secured to the front and rear straight portions, $a^2$ and $a^5$, and the front coupling clevis or hanger, $h$, substantially as herein set forth.

LEROY GRAY.

Witnesses:
P. M. ALDEN,
JOHN SYME.